United States Patent

[11] 3,622,593

| [72] | Inventors | Gert P. Volpp<br>Princeton, N.J.;<br>Luc R. Vannoorbeeck, Gasport, N.Y. |
|---|---|---|
| [21] | Appl. No. | 659,312 |
| [22] | Filed | Aug. 9, 1967 |
| [45] | Patented | Nov. 23, 1971 |
| [73] | Assignee | FMC Corporation<br>New York, N.Y. |

[54] 1,1-DIMETHYL-3-(ISOTHIAZOL-5-YL)UREA
1 Claim, No Drawings

[52] U.S. Cl. .................................................... 260/306.8 R,
71/90
[51] Int. Cl. ........................................................ C07d 91/12
[50] Field of Search ............................................ 260/306.8 I

[56]    References Cited
UNITED STATES PATENTS

| 2,839,529 | 6/1958 | Adams et al. ................. | 260/306.8 |
| 3,145,214 | 8/1964 | Slack et al. ................... | 260/306.8 |
| 3,454,591 | 7/1969 | Schulz et al. .................. | 260/306.8 |

*Primary Examiner*—Alex Mazel
*Assistant Examiner*—R. J. Gallagher
*Attorneys*—Pauline Newman and Milton Zucker ABSTRACT: A new chemical compound, of the formula 1,1-dimethyl-3-(isothiazol-5-yl)urea, has selective pre- and post-emergence herbicidal activity. The synthesis of this compound is described, and its utility is exemplified in both pre-emergence and post-emergence applications.

1,1-DIMETHYL-3-(ISOTHIAZOL-5-YL)UREA

FIELD OF THE INVENTION

This invention pertains to the general field of herbicides, and particularly to compositions which selectively control plant growth.

DESCRIPTION OF THE PRIOR ART

It is known that certain isothiazoles exhibit herbicidal activity of varying types. However, the unusual plant responses in selective preemergence and postemergence herbicidal activity, of the compound of this invention, have not previously been reported or suggested in the art.

SUMMARY OF THE INVENTION

This invention pertains to a novel herbicidal compound, to new herbicidal compositions, and to a new method for the selective control of undesired plant growth, both preemergently and postemergently. Particularly useful control of undesired plant growth is obtained in the presence of such crops as lettuce, potatoes, pepper, and cole crops such as cabbage, Brussels sprouts, cauliflower, broccoli, mustard, radish, and turnips.

DETAILED DESCRIPTION

The new herbicidal compound of this invention is the compound 1,1-dimethyl-3-(isothiazol-5-yl)urea, of the formula:

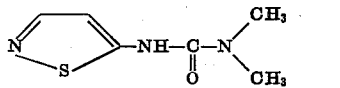

This compound, when formulated as an essential active ingredient of herbicidal compositions, and applied either preemergently or postemergently, has excellent herbicidal properties, superior in selectivity and effectiveness to those of even closely related compounds of the isothiazole class.

The preparation of 1,1-dimethyl-3-(isothiazol-5-yl)-urea is illustrated below. All temperatures are expressed in degrees Centigrade.

EXAMPLE 1. SYNTHESIS

The intermediate isothiazole-5-carboxylic acid, a known compound, was prepared as described in U.S. Pat. No. 3,145,214, issued Aug. 18, 1964. This acid was converted to the acid chloride as follows: Isothiazole-5-carboxylic acid (25.8 g.) was suspended in 100 ml. of thionyl chloride and warmed under reflux until evolution of hydrogen chloride ceased. The solution was diluted with 100 ml. of benzene and distilled in vacuo. The final fractions (27.1 g., b.p. 32 /0.25 mm.) were confirmed by infrared and nuclear magnetic resonance spectra to be isothiazole-5-carbonyl chloride.

This acid chloride was converted to the azide, followed by a Curtius Rearrangement, as follows: A solution of 13.26 g. of sodium azide in 300 ml. of peroxide-free 1,2-dimethoxyethane was placed in a flask equipped with a stirrer, a condenser and a dropping funnel. A solution of 24.60 g. of isothiazole-5-carboxylic acid chloride in 100 ml. of 1,2-dimethoxyethane was added dropwise while stirring, during 20 minutes. Stirring at room temperature was continued for 18 hours, then the mixture was filtered and the filtrate evaporated under reduced pressure, maintaining the temperature below 40°. The colorless oil was dissolved in 20 ml. of benzene, filtered, and slowly warmed on a stream bath until the evolution of nitrogen ceased. The yellow-green solid product which precipitated was collected by filtration (17.0 g., m.p. 236–238/272–274° under decomposition). The structure of 1,3,5-tri(isothiazol-5-yl)-1,3,5-triazinetrione was confirmed by infrared and nuclear magnetic resonance spectra.

This product was reacted with dimethylamine as follows: A suspension of 1,3,5-tri(isothiazolyl-5)-1,3,5-triazinetrione (6.30 g.) in 100 ml. of benzene was placed in a flask equipped with a stirrer, stacked dry ice and water condensers, and a gas inlet tube. The suspension was heated to reflux temperature and dimethylamine bubbled into the suspension for 10 minutes. The mixture was heated under reflux for an additional hour. After cooling the solid product was collected by filtration. After recrystallization from methanol, pure 1,1-dimethyl-3-(isothiazol-5-yl)urea, m.p. 236–238° was obtained. Analysis: Calc'd for $C_6H_9N_3OS$: C, 42.10; H, 5.30
Found: C, 42.47; H, 5.53

For herbicidal applications, the active ingredient of this invention may be utilized in diverse formulations, including the adjuvants and carriers normally employed to facilitate the dispersion of active ingredients in agricultural applications, recognizing the fact that the formulation and mode of application of a toxicant may affect the activity of the material in a given application. Thus, 1,1-dimethyl-3-(isothiazol-5-yl)urea may be formulated as a granule of relatively large particle size, as a powdery dust, as a wettable powder, as an emulsifiable concentrate, as a solution, or as any of several other known types of formulations, depending on the desired mode of application. For preemergence application these herbicidal compositions are usually applied either as sprays, dusts or granules in the area in which control of vegetation is desired. For postemergence control of established plant growth, sprays or dusts are most commonly used. These formulations may contain as little as 0.5 percent or as much as 95 percent or more by weight of active ingredient.

Dusts are admixtures of the active ingredient with finely divided solids such as talc, Attapulgite clay, kieselguhr and other organic and inorganic solids which act as dispersants and carriers for the toxicant; these finely divided solids have an average particle size of less than about 50 microns. A typical dust formulation, useful herein, is one containing 1.0 part of 1,1-dimethyl-3-(isothiazol-5-yl)urea and 99.0 parts of talc.

Wettable powders, also useful formulations for both pre- and postemergence herbicides, are in the form of finely divided particles which disperse readily in water or other dispersant. The wettable powder is ultimately applied to the soil either as a dry dust or as an emulsion in water or other liquid. Typical carriers for wettable powders include Fuller's earth, Kaolin clays, silicas and other highly absorbent, readily wet inorganic diluents. Wettable powders normally are prepared to contain about 5–80 percent of active ingredient, depending on the absorbency of the carrier, and usually also contain a small amount of a wetting, dispersing or emulsifying agent to facilitate dispersion. For example, a useful wettable powder formulation contains 80.8 parts of 1,1-dimethyl-3-(isothiazol-5yl)urea, 17.9 parts of Palmetto clay and 1.0 part of sodium lignosulfonate and 0.3 part of sulfonated aliphatic polyester as wetting agents.

Other useful formulations for herbicidal applications are the emulsifiable concentrates, which are homogenous liquid or paste compositions which are dispersible in water or other dispersant, and may consist entirely of 1,1-dimethyl-3-(isothiazol-5-yl)urea with a liquid or solid emulsifying agent, or may also contain a liquid carrier, such as xylene, heavy aromatic naphthas, isophorone and other nonvolatile organic solvents. For herbicidal application these concentrates are dispersed in water or other liquid carrier, and normally applied as a spray to the area to be treated. The percentage by weight of the essential active ingredient may vary according to the manner in which the composition is to be applied, but in general, comprises 0.5 to 95 percent of active ingredient by weight of the herbicidal composition.

Typical wetting, dispersing or emulsifying agents used in agricultural formulations include, for example, the alkyl and alkylaryl sulfonates and sulfates and their sodium salts; polyethylene oxides; sulfonated oils; fatty acid esters of polyhydric alcohols; and other types of surface active agents, many of which are available in commerce. The surface active agent, when used, normally comprises from 1 percent to 15 percent by weight of the herbicidal composition.

Other useful formulations for herbicidal applications include simple solutions of the active ingredient in a dispersant in which it is completely soluble at the desired concentration, such as acetone or other organic solvents. Granular formulations, wherein the toxicant is carried on relatively coarse particles, are of particular utility for aerial distribution or for penetration of cover crop canopy. Pressurized sprays, typically aerosols wherein the active ingredient is dispersed in finely divided form as a result of vaporization of a low-boiling dispersant solvent carrier such as the Freons, may also be used.

The selective preemergence and postemergence herbicidal activity of the compound of this invention is particularly striking at relatively low dosages, as illustrated in the following example:

EXAMPLE 2. SELECTIVE HERBICIDAL ACTIVITY

The preemergence herbicidal activity of 1,1-dimethyl-3-(isothiazol-5-yl)urea at 1.5 pounds per acre was demonstrated as follows: In flat pans containing sandy-loam soil were planted seeds of representative plant species. Twenty-four hours after planting, the toxicant was sprayed on the soil as an acetone-water solution, at a rate equivalent to 1.5 pounds of toxicant per acre. Both the treated flats and an untreated control were held in the greenhouse for 2 weeks, after which time the performance of the toxicant was assessed in terms of percent kill with respect to the untreated control.

Postemergence herbicidal activity was demonstrated as follows: In flat pans containing sandy-loam soil were planted seeds of representative plant species, the flats were watered, and the seeds were allowed to grow in the greenhouse for about 2 weeks. Maintaining an untreated control, the stand of plants was then sprayed with a solution of 1,1-dimethyl-3-(isothiazol-5-yl)urea in aqueous acetone, at a rate equivalent to 1.5 pounds of toxicant per acre. Both treated and untreated plants were held in the greenhouse for 2 weeks, after which time the number of surviving plants were counted and the percent kill with respect to the untreated control was determined.

Results for both preemergence and postemergence evaluations are presented in table 1 below.

Table 1. Selective Herbicidal Activity

| | Percent Kill | |
|---|---|---|
| Test Plant Species | Preemergence | Postemergence |
| Peanuts | 100 | 100 |
| Cotton | 100 | 100 |
| Corn | 20 | 60 |
| Crabgrass | 60 | 100 |
| Squash | 100 | 100 |
| Giant foxtail | 100 | 60 |
| Ryegrass | 100 | 100 |
| Sorghum | 80 | 0 |
| Carrot | 100 | 100 |
| Pigweed | 100 | 100 |
| Wheat | 100 | 100 |
| Meadow fescue | 100 | 20 |
| Watermelon | 100 | 100 |
| Sugar beet | 100 | 100 |
| Peas | 100 | |
| Lambsquarter | 100 | 100 |
| Alfalfa | 100 | 100 |
| Flax | 100 | 100 |
| Spinach | 100 | 100 |
| Cucumber | 100 | 100 |
| Yellow mustard | 70 | 80 |
| Tomato | 90 | 100 |
| Lima beans | 100 | 100 |
| Rice | 100 | 100 |
| Barnyard grass | 20 | 100 |
| Wild oats | 100 | 100 |
| Onion | 100 | 100 |
| Chickweed | 90 | 100 |
| Soy beans | 100 | 100 |
| Lettuce | 0 | -- |
| Cabbage | 0 | 0 |
| Broccoli | 0 | 0 |
| Mustard | 0 | 0 |
| Turnip | 0 | 0 |
| Pepper | 0 | 0 |
| Radish | 0 | 0 |
| Potato | 0 | 0 |
| Brussels sprouts | 0 | 0 |
| Cauliflower | 0 | 0 |

The results shown in table 1 show the outstanding selectivity of this novel herbicide, in favor of potatoes, lettuce, pepper and cole crops including cabbage, Brussels sprouts, cauliflower, broccoli, mustard, radish, and turnips.

The active herbicidal compound of this invention may be formulated and/or applied with insecticides, fungicides, nematocides, plant growth regulators, fertilizers, and other agricultural chemicals, and as an effective soil sterilant as well as an herbicide. In applying the active compound of this invention, whether formulated alone or with other agricultural chemicals, an effective amount and concentration of 1,1-dimethyl-3-(isothiazol-5-yl)urea is of course employed.

It is apparent that various modifications may be made in the formulation and application of the novel compound of this invention, without departing from the inventive concept herein, as defined in the following claim:

1. 1,1-Dimethyl-3(isothiazol-5-yl)urea.

* * * * *

UNITED STATES PATENT OFFICE
CERTIFICATE OF CORRECTION

Patent No. 3,622,593         Dated November 23, 1971

Inventor(s) Gert P. Volpp & Luc R. Vannoorbeeck

It is certified that error appears in the above-identified patent and that said Letters Patent are hereby corrected as shown below:

Column 4, line 12, Table I under peas-postemergence, the blank space opposite "Peas" should read --100--.

Signed and sealed this 9th day of January 1973.

(SEAL)
Attest:

EDWARD M. FLETCHER, JR.
Attesting Officer

ROBERT GOTTSCHALK
Commissioner of Patents